US012559426B2

(12) United States Patent
Chung et al.

(10) Patent No.: US 12,559,426 B2
(45) Date of Patent: Feb. 24, 2026

(54) CERAMIC DIELECTRICS WITH HIGH PERMITTIVITY AND LOW DIELECTRIC LOSS AND PREPARATION METHOD THEREFOR

(71) Applicant: Korea Advanced Institute of Science and Technology, Daejeon (KR)

(72) Inventors: Sung-Yoon Chung, Daejeon (KR); Ji-Sang An, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 975 days.

(21) Appl. No.: 17/730,105

(22) Filed: Apr. 26, 2022

(65) Prior Publication Data

US 2023/0033065 A1 Feb. 2, 2023

(30) Foreign Application Priority Data

Jul. 30, 2021 (KR) ........................ 10-2021-0100616

(51) Int. Cl.
*C04B 35/468* (2006.01)
*C04B 35/626* (2006.01)
(Continued)

(52) U.S. Cl.
CPC ...... *C04B 35/4682* (2013.01); *C04B 35/6261* (2013.01); *C04B 35/6264* (2013.01);
(Continued)

(58) Field of Classification Search
CPC ........ C04B 35/4682; C04B 2235/3236; C04B 2235/85; C04B 2235/768; H01G 4/1227
See application file for complete search history.

(56) References Cited

U.S. PATENT DOCUMENTS

2001/0040784 A1* 11/2001 Naito ................... H01G 4/1245
                                                        361/321.2
2021/0055580 A1* 2/2021 Wells .................... C04B 35/491

FOREIGN PATENT DOCUMENTS

KR        20110004904 U      5/2011

OTHER PUBLICATIONS https://en.wikipedia.org/wiki/Barium_titanate Accessed Jun. 11, 2025 (Year: 2025).*

(Continued)

*Primary Examiner* — Cameron K Miller
(74) *Attorney, Agent, or Firm* — CHRISTENSEN O'CONNOR JOHNSON KINDNESS PLLC

(57) ABSTRACT

Disclosed is a polycrystalline ceramic dielectric comprising: crystal grain bulks made of a barium titanate-based ceramic; and grain boundaries comprising interfaces between the crystal grain bulks, wherein the composition of the grain boundaries is controlled using dopants. By controlling the grain boundary composition using dopants so that the dopants are distributed across a width of 5 nm or less and using a nano-sized, fine-grained barium titanate-based ceramic precursor, the grain boundary structure within the polycrystals may maintain electroneutrality, and their ferroelectricity may be controlled, thereby allowing for smoother polarization reaction. Accordingly, the present disclosure provides polycrystalline ceramic dielectrics that have dielectric properties such as high permittivity and low dielectric losses in a wide frequency range, a small amount of reduction in electric field-dependent relative permittivity, high temperature stability, non-reducibility under a reduction sintering condition, and resulting high insulation resistance, and a preparation method therefor.

19 Claims, 18 Drawing Sheets

(51) Int. Cl.
   *C04B 35/64* (2006.01)
   *H01G 4/12* (2006.01)
   *H01G 4/30* (2006.01)

(52) U.S. Cl.
   CPC ........ *C04B 35/62655* (2013.01); *C04B 35/64*
       (2013.01); *C04B 2235/3217* (2013.01); *C04B*
          *2235/3236* (2013.01); *C04B 2235/3262*
       (2013.01); *C04B 2235/3272* (2013.01); *C04B*
          *2235/3279* (2013.01); *C04B 2235/3286*
       (2013.01); *C04B 2235/3418* (2013.01); *C04B*
          *2235/5454* (2013.01); *C04B 2235/604*
        (2013.01); *C04B 2235/85* (2013.01); *H01G*
          *4/1227* (2013.01); *H01G 4/30* (2013.01)

(56) References Cited

OTHER PUBLICATIONS

Hiramatsu et al., Effects of grain boundary on dielectric properties in fine-grained BaTiO3 ceramics, 2005.

* cited by examiner

BaTiO$_3$ grain boundary composition control using 2Mn

BaTiO$_3$ grain boundary composition control using 2Fe

BaTiO$_3$ grain boundary composition control using 5Ni

BaTiO$_3$ grain boundary composition control using 5Al

BaTiO$_3$ grain boundary composition control using 5Ga

BaTiO$_3$ grain boundary composition control using 2Mn $BaTiO_3$ grain boundary composition control using 2Fe BaTiO₃ grain boundary composition control using 2Fe

CERAMIC DIELECTRICS WITH HIGH PERMITTIVITY AND LOW DIELECTRIC LOSS AND PREPARATION METHOD THEREFOR

CROSS-REFERENCES TO RELATED APPLICATION

This application is based on and claims priority under 35 U.S.C. 119 to Korean Patent Application No. 10-2021-0100616, filed on Jul. 30, 2021 in the Korean intellectual property office, the disclosure of which is herein incorporated by reference in its entirety.

TECHNICAL FIELD

The present disclosure relates to ceramic dielectrics that have low dielectric losses and high permittivity in a wide frequency range and offer stable electric field-dependent relative permittivity and temperature stability by controlling the grain boundary composition of a polycrystalline dielectric through the use of nano-sized polycrystals and the control of distribution of large quantities of acceptor dopants, and a preparation method therefor.

BACKGROUND OF THE INVENTION

Multi-layer ceramic capacitors (MLCC) which consist of ceramic dielectric materials and metal electrode layers stacked together are used for various purposes such as smoothing, bypass, and coupling of electric signals in circuits, because they have high permittivity and high volumetric efficiency owing to their efficient structures. For more efficient functioning of MLCCs in response to an electric signal, it is necessary to develop MCCSs with higher relative permittivity and lower dielectric losses, and the commonly used Class-II stacked ceramic capacitors are made of ferroelectric materials such as barium titanate ($BaTiO_3$).

A stacked ceramic capacitor consists of ceramic dielectric layers and nickel metal electrode layers sequentially stacked upon each other, and the two types of layers need to be thermally treated simultaneously. In this process, sintering is generally performed in a reducing atmosphere at 1,200° C. or under, in order to prevent oxidation of the nickel electrode layers and unnecessary reactions between the ceramic layers and the nickel metal layers. Based on this, the aforementioned two primary factors should be taken into account when new oxide dielectrics are applied to stacked ceramic capacitors. Even under a sintering condition in a reducing atmosphere for preventing the oxidation of the nickel electrode layers, the oxide dielectrics are required to be non-reducible and maintain relative permittivity, dielectric losses, and insulation resistance at certain levels. Along with this, sintering is performed at 1,200° C. or under in order to prevent side reactions between the oxide dielectrics and the nickel electrode layers, and the oxide dielectrics should be made compact enough in this temperature range. Although a lot of research has been conducted into oxide dielectrics with high relative permittivity, very little of the research has been actually successful with the above two factors for stacked ceramic capacitor applications.

Moreover, technologies and electronic equipment that use a high frequency band of $10^8$ Hz and above, as in wireless charging, wireless communication, and power transmission, instead of the existing low frequency range of $10^6$ Hz and below, are receiving attention. As opposed to these, most oxide dielectrics with high relative permittivity are not able to prevent a delay in polarization motion in a high frequency range, and therefore exhibit high dielectric losses. Accordingly, the key element of ceramic capacitor technology is to have sufficiently high relative permittivity and low dielectric losses in a wide frequency range.

SUMMARY

The present disclosure provides a polycrystalline ceramic dielectric that has high relative permittivity, high insulation resistance, low dielectric losses, and high temperature stability in a wide frequency range from 100 Hz to 1 GHz by using a technique of controlling the grain boundary composition of the polycrystalline dielectric through the use of nano-sized barium titanate and the proper use of acceptor dopants.

By controlling the grain boundary composition by using nano-sized barium titanate and introducing dopants into the grain boundaries of a polycrystalline ceramic dielectric made of this nano-sized barium titanate, it is possible to overcome electrically nonuniform structures at the grain boundaries of existing polycrystalline dielectrics and to suppress grain growth there, thereby achieving low ferroelectricity. The recovery of electrically uniform structures at the grain boundaries and the suppression of grain growth there can efficiently reduce dielectric losses in a low-frequency range and a high-frequency range, respectively, and allow for low dielectric losses in a wide frequency range. Moreover, high relative permittivity, high insulation resistance, and high temperature stability can be maintained.

A method of preparing the above-described ceramic dielectric can be provided.

An exemplary embodiment of the present disclosure provides a polycrystalline ceramic dielectric comprising: crystal grain bulks made of a barium titanate-based ceramic; and grain boundaries comprising interfaces between the crystal grain bulks, wherein the composition of the grain boundaries is controlled using dopants.

According to one aspect, the ceramic has $ABO_3$, wherein the A at least comprises Ba, and the B at least comprises Ti.

According to another aspect, the A further comprises Ca, Sr, or a combination thereof.

According to yet another aspect, B further comprises Zr, Hf, or a combination thereof.

According to a further aspect, the dopants comprise Mn, Fe, Co, Ni, Al, Ga, or a combination thereof.

According to a further aspect, the dopants are distributed in a concentration of 1 to 10 molar parts with respect to 100 molar parts of the ceramic.

According to a further aspect, precursor powder of the barium titanate for the ceramic has an average particle diameter of 50 nm or less.

According to a further aspect, the dopants are distributed across a width of 5 nm or less with respect to the center of the grain boundaries.

According to a further aspect, the dopants are distributed in the highest concentration at the center of the grain boundaries, and are normally distributed to decrease in concentration from the center of the grain boundaries in both directions.

According to a further aspect, the dopants are present in the crystal grain bulks in a concentration of 0.5 molar parts or less with respect to 100 molar parts of the ceramic, and the crystal grain bulks maintain ferroelectricity.

According to a further aspect, random grain growth of the crystal grain bulks is suppressed using the dopants.

According to a further aspect, each of the crystal grain bulks has an average crystal grain size not more than twice the diameter of the barium titanate precursor for the ceramic.

According to a further aspect, the polycrystalline ceramic dielectric has a relative permittivity of 800 to 2,000 depending on the size of the crystal grain bulks, and maintains the value of the relatively permittivity depending on the frequency.

According to a further aspect, the polycrystalline ceramic dielectric has dielectric losses of 1% or less in a frequency range of 100 MHz and below and dielectric losses of 2.5% or less in a frequency range of 1 GHz and below.

According to a further aspect, the polycrystalline ceramic dielectrics maintains non-reducibility under in a reducing sintering atmosphere. In this case, the polycrystalline ceramic dielectric may have dielectric properties and insulation resistivity similar to those sintered in an atmospheric condition.

According to a further aspect, the polycrystalline ceramic dielectric has a relative permittivity variation range of ±15% at temperatures up to 150° C. or a relative permittivity variation range of ±22% at temperatures up to 200° C.

Another exemplary embodiment of the present disclosure provides a method for preparing polycrystalline ceramic dielectrics, the method comprising: producing a mixture comprising crystallized barium titanate and dopant precursor powder; generating a mixed solution by dispersing and grinding the produced mixture using an ethanol solvent; generating mixed powder by drying the mixed solution; generating a disc-shaped pellet sample by pressure-forming the mixed powder; and producing a polycrystalline ceramic dielectric by sintering the disc-shaped pellet sample.

It is possible to provide polycrystalline ceramic dielectrics that have dielectric properties such as high permittivity and low dielectric losses in a wide frequency range, high insulation resistance, and high temperature stability, and a preparation method therefor. There are two main factors that increase the dielectric losses of the polycrystalline dielectrics at low frequencies and high frequencies, respectively. The increase in dielectric loss at low frequencies is associated with the grain boundary structure of polycrystals. That is, a delay in polarization motion caused by an electrical double layer in the grain boundary area is the cause of the high dielectric loss. The increase in dielectric loss at high frequencies is caused by the high ferroelectricity of ferroelectrics used to achieve high relative permittivity. In embodiments of the present disclosure, the grain boundaries may have an electrically stable structure by controlling the grain boundary composition through the control of dopant distribution to overcome electrically nonuniform structures at the grain boundaries and control high ferroelectricity, and at the same time the ferroelectricity may be reduced by suppressing the grain growth in the polycrystalline dielectrics. For more efficient suppression of ferroelectricity, nanosized barium titanate may be actively used to form fine crystal grains.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
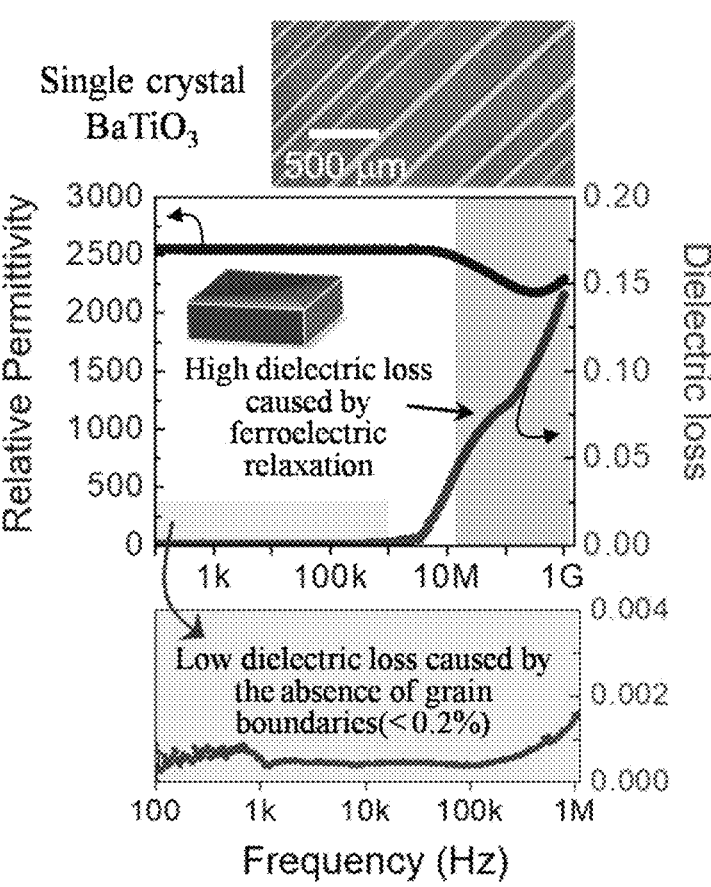
FIG. 1 is a diagram showing an example of frequency-dependent dielectric properties measured of a single crystal barium titanate ceramic dielectric with a single composition.

The present disclosure may be subjected to many changes and have several forms, and specific embodiments thereof are illustrated in the drawings and described in detail in the specification.

However, it will be understood that a configuration shown in the embodiments and drawings described herein is merely one of the most preferred examples of the present disclosure, and that the present disclosure is not intended to be limited to the specific forms set forth herein, and all changes, equivalents, and substitutions included in the technical scope and spirit of the present disclosure are included.

In describing the embodiments of the present disclosure, a detailed description of related well-known arts will be omitted when it is deemed that they may unnecessarily obscure the subject matter of the present disclosure.

In the case of ferroelectrics such as barium titanate, the positions of atoms corresponding to the center of each unit of a lattice are off-centered. This asymmetry at the center of the unit of the lattice induces a spontaneous polarization. Such a spontaneous polarization in ferroelectrics may act as an orientation polarization in ceramics. The orientation polarization acts as an additional polarization, in addition to electron polarization and ionic polarization in paraelectrics, and the degree of this polarization is much higher than the other two types of polarization. For this reason, the relative permittivity of ferroelectrics is at least several tens of times higher than the relative permittivity of paraelectrics. As is with all types of polarization, the orientation polarization in ferroelectric ceramics does not occur any longer due to an increase in AC frequency, which generally leads to a Debye-type relaxation in the GHz range.

For ceramic dielectrics according to an embodiment of the present disclosure, the crystal grain size of a final crystal bulk is mostly 300 nm or less, and, in particular, it is desirable that the grains grow not more than twice the grain size of initial precursor powder before sintering. In embodiments of the present disclosure, it is possible to obtain dielectric ceramics that have low dielectric losses of less than 1% in an AC frequency range of 10 or 100 MHz and below and low dielectric losses of less than 2.5% at frequencies of up to 1 GHz, by controlling the size of the crystal grain powder and the dopant concentration at the interface between grains.

Figure 2:
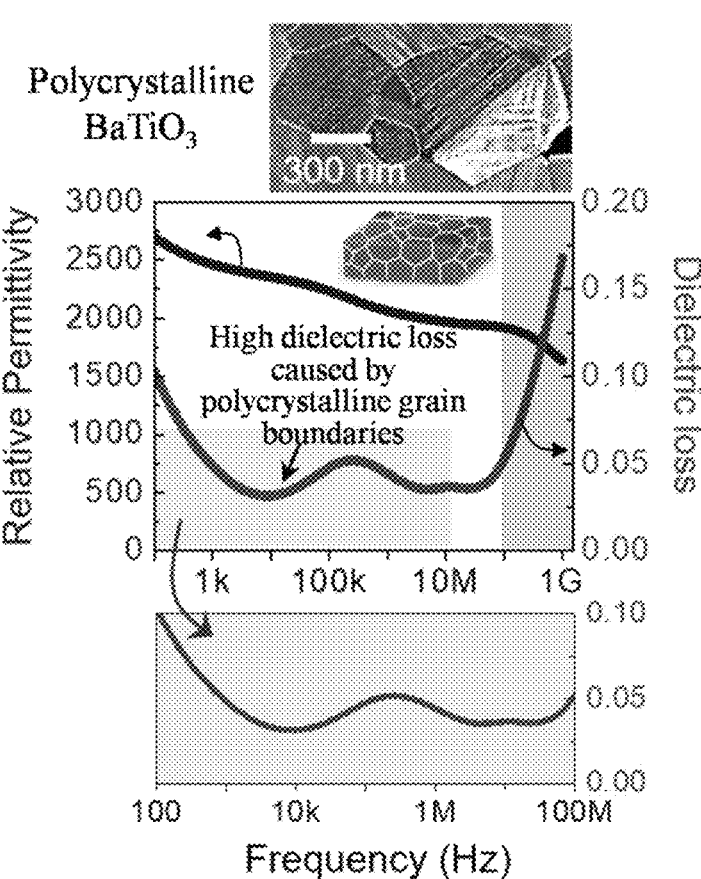
FIG. 2 is a diagram showing an example of frequency-dependent dielectric properties measured of a polycrystalline barium titanate ceramic dielectric according to an embodiment of the present disclosure.

FIG. 1 is a diagram showing an example of frequency-dependent dielectric properties measured of a single crystal barium titanate ceramic dielectric with a single composition. FIG. 2 is a diagram showing an example of frequency-dependent dielectric properties measured of a polycrystalline barium titanate ceramic dielectric according to an embodiment of the present disclosure. From a comparison of dielectric properties at different AC frequencies between a single-phase, single crystal barium titanate of FIG. 1 and a polycrystalline barium titanate ceramic of FIG. 2, three important characteristics were found. First, the single crystal barium titanate had an extremely low dielectric loss less than 0.2% in a range of 1 MHz and below. Second, the single crystal barium titanate showed a sharp decrease in relative permittivity and an increase in dielectric constant at 10 MHz and higher, whereas such a sharp change in the dielectric properties of the polycrystalline barium titanate was somewhat shifted to a higher frequency range of 100 MHz and above. Lastly, the polycrystalline barium titanate had a high dielectric loss of about 5% at 100 MHz and below, unlike the single crystal barium titanate with a low dielectric loss. From this, it can be seen that the polycrystalline grain boundary area adversely affects smooth polarization switching in ceramic ferroelectrics.

Figure 3:
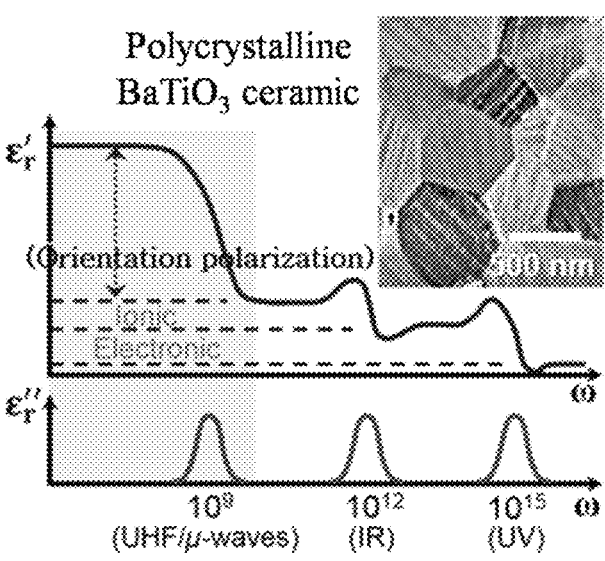
FIG. 3 is a schematic diagram showing frequency-dependent dielectric properties measured of ferroelectric barium titanate and the type of polarization thereof, according to an embodiment of the present disclosure.
Figure 4:
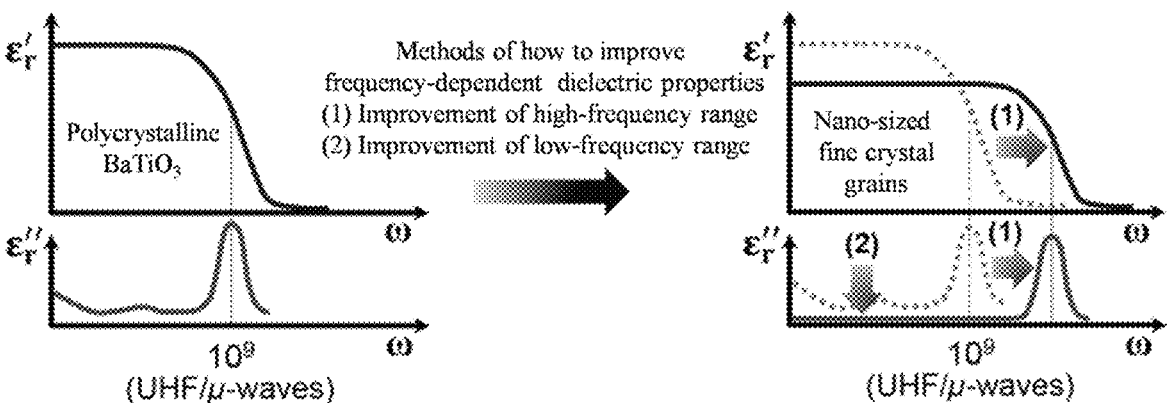
FIG. 4 is a diagram illustrating methods of how to improve frequency-dependent dielectric properties of a ceramic dielectric prepared according to an embodiment of the present disclosure.

FIG. 3 is a schematic diagram showing frequency-dependent measurements of dielectric properties of ferroelectric barium titanate and types of polarization, according to an embodiment of the present disclosure. FIG. 4 is a diagram illustrating methods of how to improve frequency-dependent dielectric properties of a ceramic dielectric prepared according to an embodiment of the present disclosure. Based on results of the aforementioned comparison of the dielectric properties between the single crystal barium titanate with a single composition and the polycrystalline barium titanate ceramic, it was possible to find a new way to improve stacked ceramic capacitors. To prepare ceramic dielectrics that have constantly low dielectric losses in a very wide AC frequency range of up to 1 GHz or so, two main control factors affecting both high and low-frequency ranges will be improved.

Figure 5:
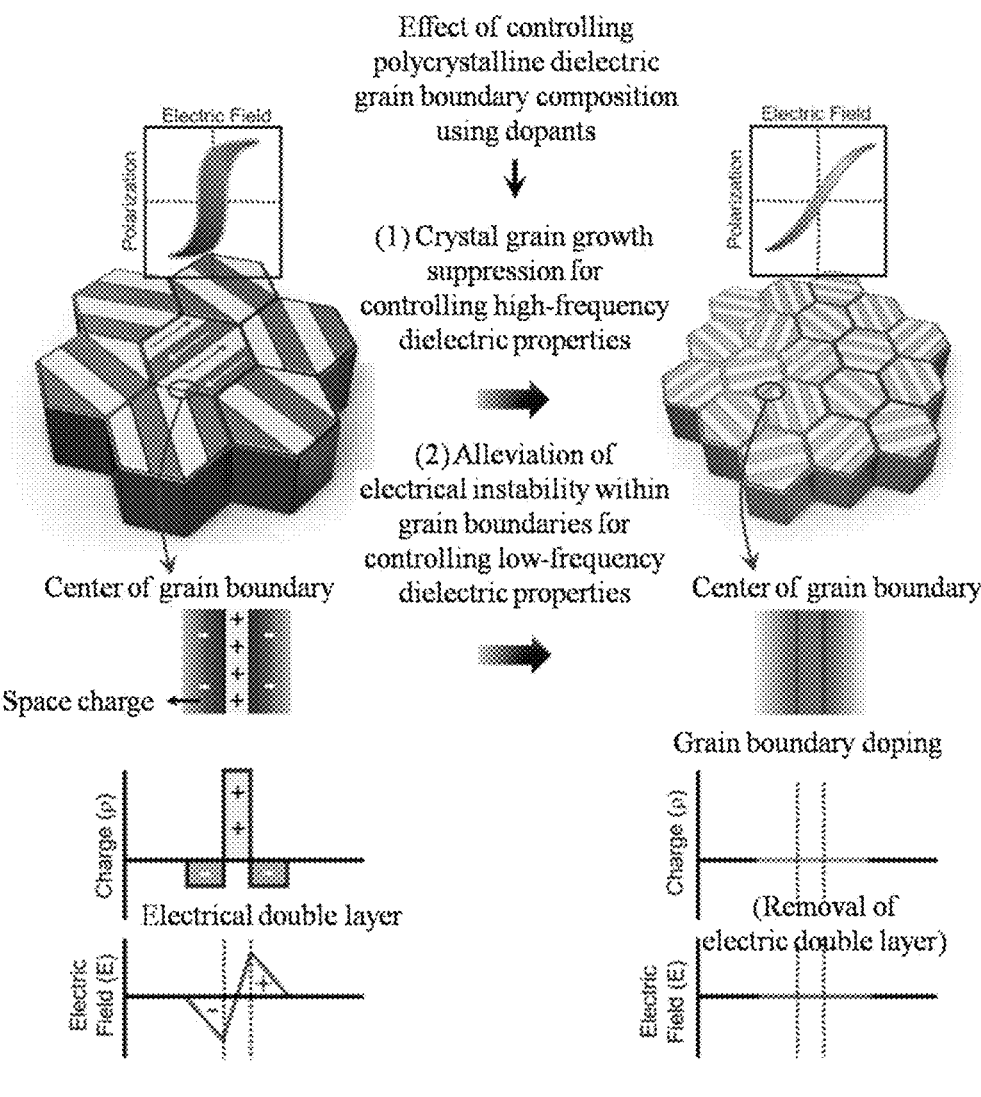
FIG. 5 shows results obtained by controlling the grain boundary composition of a polycrystalline dielectric using dopants according to an embodiment of the present disclosure, which depict a decrease in ferroelectricity and a relaxation of an electrical double layer at the grain boundaries through grain growth suppression.

FIG. 5 shows results obtained by controlling the grain boundary composition of a polycrystalline dielectric using dopants according to an embodiment of the present disclosure, which depict a decrease in ferroelectricity and a relaxation of an electrical double layer at the grain boundaries through grain growth suppression.

Firstly, the growth and size of crystal grains need to be adjusted to efficiently suppress dielectric looses at high frequencies of 100 MHz and above. It is widely known that orientation polarization relaxation caused by a ferroelectric domain structure at AC frequencies occurs usually at around 1 GHz, and the dielectric properties decrease with decreasing frequency in inverse proportion to domain size. While ferroelectric polarization relaxation of single crystal barium titanate occurs from 10 MHz, ferroelectric polarization relaxation of polycrystalline barium titanate occurs in a higher frequency range of 100 MHz and above, which may be clear evidence of the above prediction. Moreover, the tetragonality and domain size of ferroelectrics such as barium titanate are directly proportional to crystal grain size, and the smaller the crystal grains, the lower the ferroelectricity. Accordingly, a fine barium titanate precursor of about 50 nm was used in order to prepare a polycrystalline ceramic dielectric having a fine domain structure with low ferroelectricity that shows smoother polarization reaction to AC frequencies. Ceramic dielectrics using such fine precursor powder also may maintain high relative permittivity of $10^3$ or above and very low dielectric losses of 2.5% or below even at 1 GHz. A schematic diagram of a method of improvement for reducing dielectric loss at high frequencies according to an embodiment of the present disclosure is depicted in the upper part of FIG. 5.

Additionally, the core technology is considered to overcome electrical nonuniform structures at grain boundaries in order to efficiently reduce dielectric losses at low frequencies of 10 or 100 MHz and below. It is an established fact that an electrical double layer generally exists at the grain boundaries of polycrystalline oxide ceramics, and such an electrical double layer is made up of an excess charge located at the center of a ground boundary and a space charge located close to the center of the ground boundary. The electrical double layer induces an internal electric field in the grain boundary area, and this internal electric field causes an electrostatic reaction of ferroelectric polarization. This may be confirmed by the observation that the single crystal barium titanate with no grain boundaries showed an extremely low dielectric loss at 10 MHz and below, whereas the polycrystalline barium titanate with grain boundaries showed a high dielectric loss of 5% at 100 MHz and below. Thus, in order to eliminate the nonuniform structures at the grain boundaries caused by the electrical double layer, the present disclosure aims to provide an optimized polarization region which smoothly reacts depending on frequency by controlling the grain boundary composition of polycrystalline dielectrics using dopants. The control of the grain boundary composition of a polycrystalline dielectric using dopants may have the effect of crystal grain growth suppression, and this may lead to an additional advantage in the improvement of dielectric losses at high frequencies. A schematic diagram of a method of improvement for reducing dielectric loss at low frequencies according to an embodiment of the present disclosure is depicted in the lower part of FIG. 5.

As described above, attempts were made to improve dielectric losses in a wide frequency range encompassing low frequencies and high frequencies, and to this end, the grain boundary composition of polycrystalline ceramic dielectrics was controlled using dopants. As these dopants, dopants acting as acceptors for barium titanate-based ceramic dielectrics were used. Such accept dopants may comprise Mn, Fe, Ni, Al, Ga, or a combination thereof.

The use of the acceptor dopants gives non-reducibility by which no reduction occurs even if heat treatment is done under a reducing condition during the sintering process of ceramic dielectrics. High concentrations of acceptor dopants across the width of fine distribution in the grain boundaries create intrinsic oxygen vacancies, and this plays a role in preventing extrinsic oxygen vacancies and electrons created by a reducing atmosphere, thereby giving non-reducibility. Accordingly, due to the use of acceptor dopants, a ceramic dielectric prepared by sintering in an atmospheric condition and a ceramic dielectric produced by sintering in a reducing atmosphere of 0.5% $H_2$—$N_2$ may exhibit very similar insulation resistivity and resulting similar dielectric properties.

Through grain boundary composition control using dopants, the dopants may be very narrowly distributed across a total width of 5 nm or less, that is, around 2.5 nm on either side from the center of the grain boundaries to the crystal grain bulks.

As such, the control of the composition in the very thin grain boundary area may show effects such as efficiently reducing dielectric losses and maintaining high relative permittivity by maintaining the ferroelectricity of the crystal grain bulks. The crystal grain bulks may fully maintain barium titanate-based ferroelectricity since they occupy most of the ceramic dielectric, except for a width of 5 nm with respect to the center of the grain boundary, and this is the biggest difference from generally and commonly used core-shell structures.

In a polycrystalline dielectric with a core-shell structure, a specific center area alone within a crystal grain bulk is the core which maintains ferroelectricity, and the remaining half or more of the grain bulk is the shell which has paraelectricity in the form of a dopant-solid solution. Thus, this polycrystalline dielectric with such a core-shell structure may not be able to maintain the ferroelectricity of the crystal grain bulk and therefore may show a significant drop in relative permittivity.

For effective grain boundary composition control, high concentrations of dopants are required to be present in a thin distribution area, and, to this end, the dopants may be used in a high concentration of 1 to 10 molar parts with respect to 100 molar parts of a barium titanate-based ceramic. If the dopant concentration is less than 1 molar part, the control of the grain boundary composition may be weak due to the relatively small concentration. If the dopant concentration exceeds 10 molar parts, a dopant distribution layer of 5 nm or more may be formed, as in the formation of a secondary phase or the diffusion of the dopants toward the crystal grain bulk. This may increase dielectric losses and significantly reduce relative permittivity.

Figure 6:
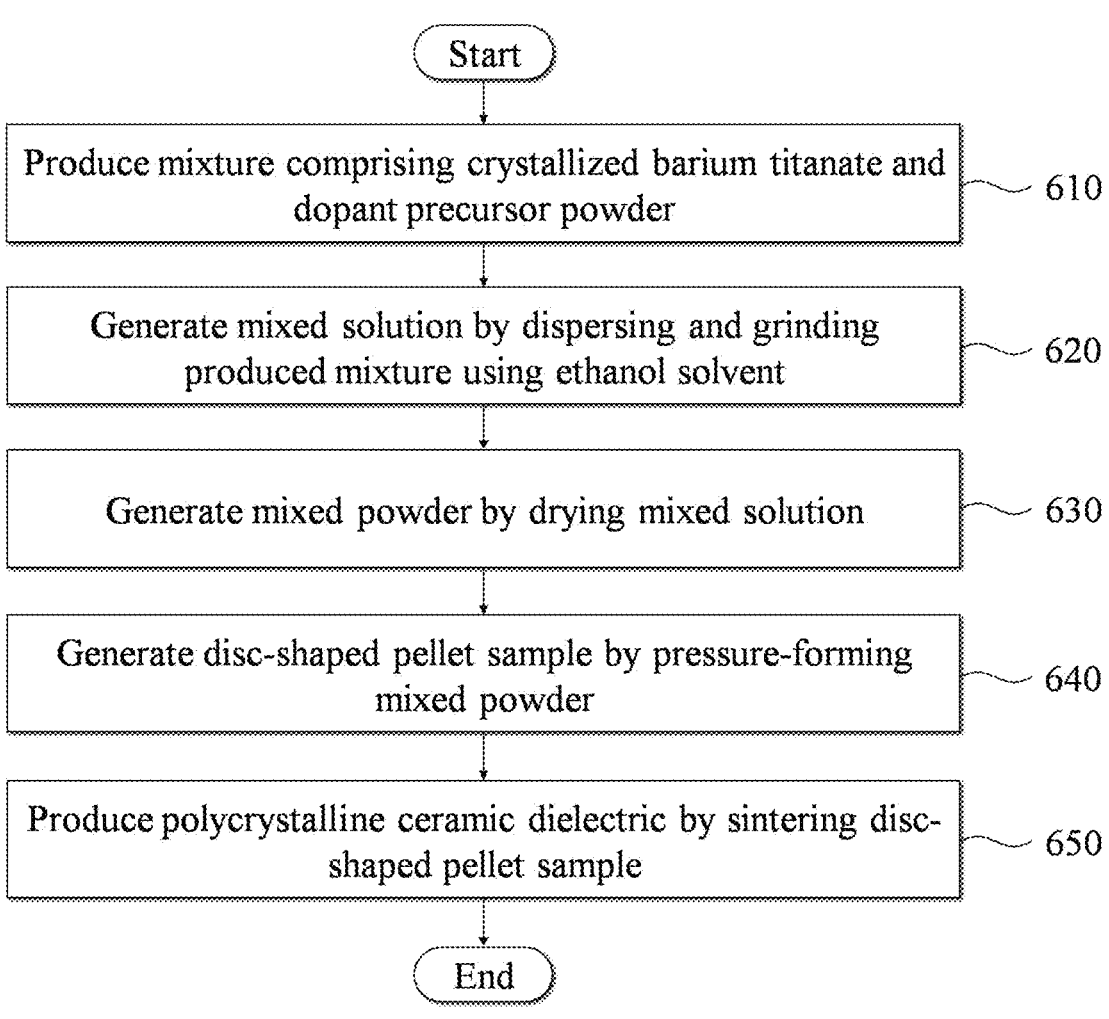
FIG. 6 is a flowchart illustrating an example of a method for preparing polycrystalline ceramic dielectrics according to an embodiment of the present disclosure.

FIG. 6 is a flowchart illustrating an example of a method for preparing polycrystalline ceramic dielectrics according to an embodiment of the present disclosure. The method for preparing polycrystalline ceramic dielectrics according to this embodiment may include the step 610 of producing a mixture comprising crystallized barium titanate and dopant precursor powder; the step 620 of generating a mixed solution by dispersing and grinding the produced mixture using an ethanol solvent; the step 630 of generating mixed powder by drying the mixed solution; the step 640 of generating a disc-shaped pellet sample by pressure-forming the mixed powder; and the step 650 of producing a polycrystalline ceramic dielectric by sintering the disc-shaped pellet sample. Here, the crystallized barium titanate may comprise powder with a diameter of 50 nm or less. Also, the crystallized barium titanate may comprise an acceptor dopant acting as an acceptor to keep the polycrystalline ceramic dielectric insulated even under a sintering condition of a reducing atmosphere. In this case, the acceptor dopant may comprise Mn, Fe, Co, Ni, Al, Ga, or a combination thereof. Moreover, in the step 610, the mixture may be produced by adding silicon dioxide ($SiO_2$) to densificate the polycrystalline ceramic dielectric.

Hereinafter, concrete embodiments of the present disclosure are proposed. However, the following embodiments are only for concrete exemplification or illustration, and the scope of the present disclosure is not limited by them.

PREPARATION EXAMPLE: PREPARATION OF POLYCRYSTALLINE DIELECTRIC WHOSE GRAIN BOUNDARY COMPOSITION WAS CONTROLLED USING DOPANTS

Dopants need to be distributed selectively at grain boundaries to control the grain boundary composition of a polycrystalline dielectric. To this end, the preparation was conducted in such a way that a dopant precursor was mixed with pre-crystallized barium titanate powder and sintered by heat treatment.

Moreover, the barium titanate pre-crystallized to show the size of fine-grained crystals in the polycrystalline ceramic dielectric is powder having a diameter of about 50 nm.

The pre-crystallized barium titanate and the dopant precursor powder were weighted in their respective proper proportions to produce a mixture. An acceptor dopant acting as an acceptor for the barium titanate was used to keep the ceramic dielectric insulated even under a sintering condition of a reducing atmosphere, and acceptor dopant types include MnO, $Fe_2O_3$, NiO, $Al_2O_3$, and $Ga_2O_3$.

In addition, silicon dioxide ($SiO_2$) was added in a given amount relative to the amount of barium titanate in order to facilitate the densification of the polycrystalline ceramic dielectric after sintering it by heat treatment.

After weighing, wet milling was conducted for 24 hours using a high-purity ethanol solvent as media, along with zirconia balls, in order to disperse and grind the mixtures.

After completion of the milling, the raw powder mixture solution was dried into a slurry on a hot plate and then the remaining solvent was fully dried in an oven of 80° C. or above.

The dried powder was sufficiently ground using an agate mortar and pestle, and was then filtered with a 75 μm sieve.

The mixed powder was pressure-formed into a disc-shaped pellet using an 8 mm metal mold. Afterwards, cold isostatic pressing was performed for 10 minutes at a pressure of 200 Mpa, by which the densification was done more efficiently in the sintering process.

Disc-shaped pellet samples were sintered for 1 hour at 1,200° C. by using a vertical furnace. To perform the sintering in various atmospheres such as oxidation and reduction, four types of sintering atmospheric conditions— air, nitrogen ($N_2$), 0.5% $H_2$—$N_2$, and 1% $H_2$—$N_2$, were used. Various analyses of the polycrystalline ceramic dielectric were conducted on the sintered samples in a 0.5% $H_2$—$N_2$ atmospheric condition.

TEST EXAMPLE 1: CONTROL OF GRAIN BOUNDARY COMPOSITION THROUGH CONTROL OF DOPANT DISTRIBUTION AND QUALITIVE AND QUANTITATIVE ANALYSES THEREOF

Figure 7:
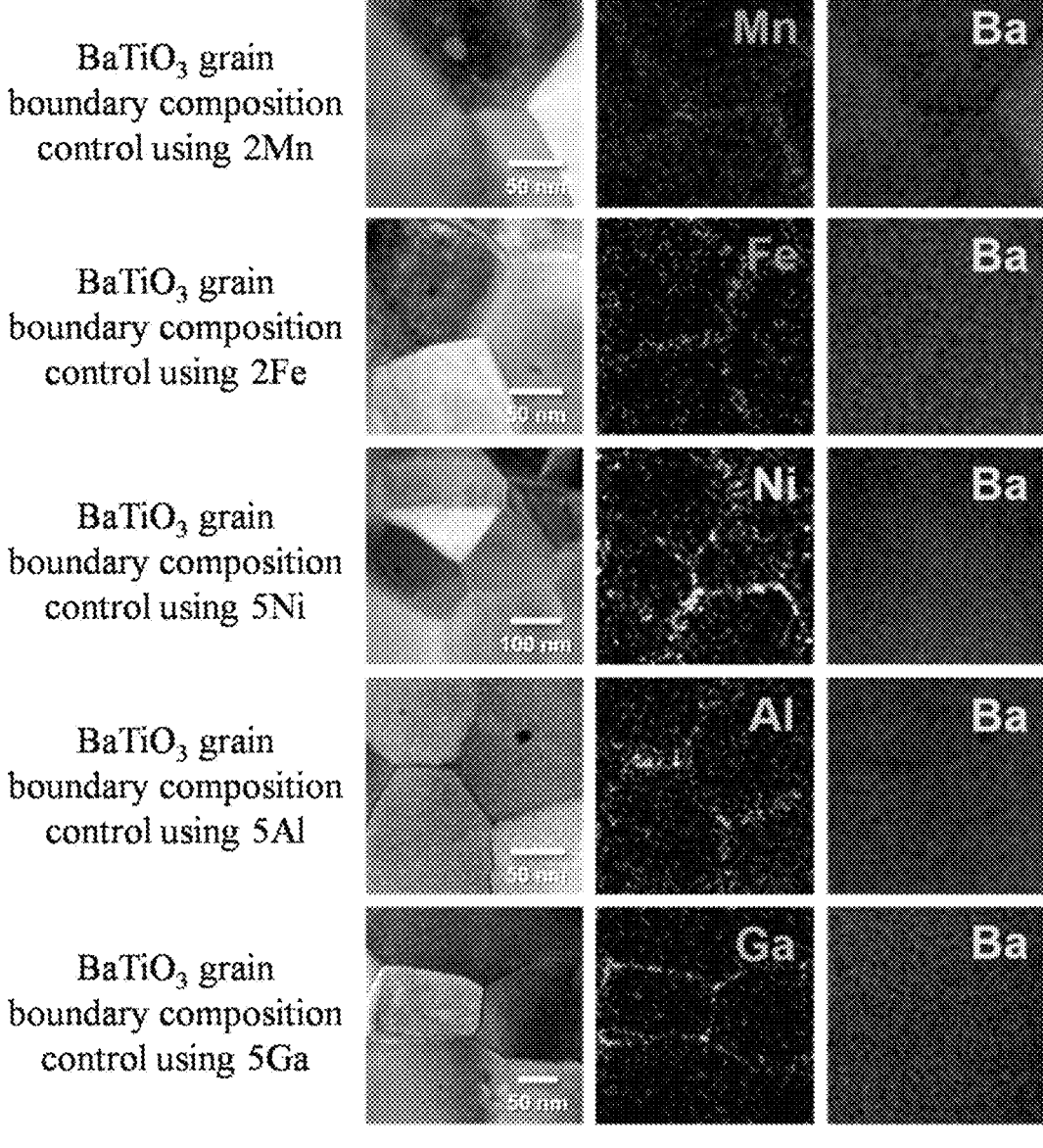
FIG. 7 shows images of various forms and positions of distribution of atoms for different types of dopants obtained by energy-dispersive spectroscopic analysis, in polycrystalline dielectrics whose grain boundary composition was controlled using dopants, which were thermally treated under a 0.5% $H_2$—$N_2$ reducing atmosphere, according to an embodiment of the present disclosure.

Energy-dispersive spectroscopic analysis using a scanning transmission electron microscope was performed in order to conduct direct investigation and qualitative and quantitative analyses of whether the grain boundary composition of the polycrystalline ceramic dielectric prepared in the preparation example is adjusted and controlled by dopants, and the results were illustrated in FIG. 7.

FIG. 7 shows images of various forms and positions of distribution of atoms for different types of dopants obtained by energy-dispersive spectroscopic analysis, in polycrystalline dielectrics whose grain boundary composition was controlled using dopants. The polycrystalline ceramic dielectrics shown in FIG. 7 are a typical representation of those sintered in a reducing atmosphere of 0.5% $H_2$—$N_2$. It can be seen that the atoms in every dopant are highly noticeable in the polycrystalline ceramic grain boundary areas, regardless of the type of dopant, in the polycrystalline dielectrics whose grain boundary composition was controlled using dopants. From these results, it can be directly found out that the dopants have a grain boundary composition control structure suitable for a polycrystalline ceramic dielectric structure which an example of implementation is aiming at.

Through the energy-dispersive spectroscopic analysis, it was observed that the dopants were evidently controlling the grain boundary composition of the polycrystalline dielectrics. For a more detailed and microscopic analysis of the grain boundary composition control structures of dopants, electron energy loss spectroscopy was conducted using a scanning transmission electron microscope, and the results were depicted in FIG. 8.

Figure 8:
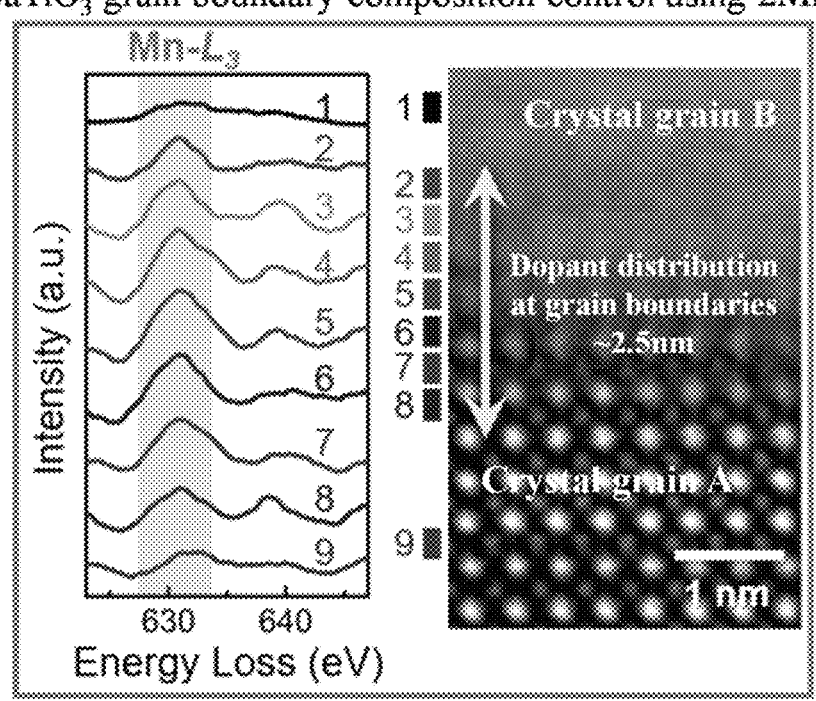
FIGS. 8 to 10 are views illustrating an area in which dopant atoms are distributed with respect to the center of the grain boundaries, in polycrystalline dielectrics whose grain boundary composition was controlled using dopants, which were thermally treated under a 0.5% $H_2$—$N_2$ reducing atmosphere, according to an embodiment of the present disclosure.
Figure 9:
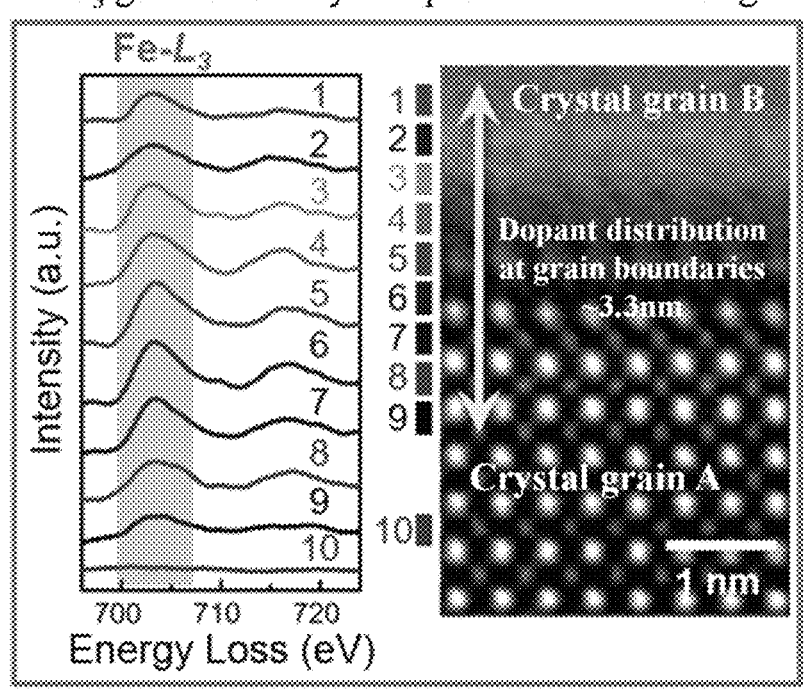
Figure 10:
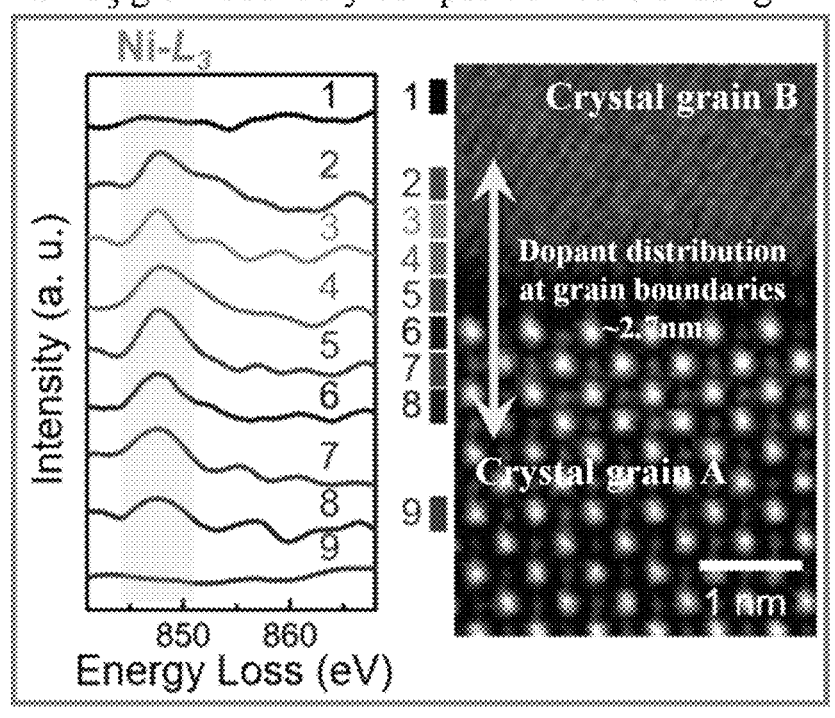

FIGS. 8 to 10 are images and results obtained by conducting an atomic analysis on grain boundary areas by using energy loss spectroscopy on polycrystalline dielectrics whose grain boundary composition was controlled using dopants. The polycrystalline ceramic dielectrics shown in the drawings are a typical representation of those sintered in a reducing atmosphere of 0.5% $H_2$—$N_2$. It can be seen that a very thin dopant grain boundary control layer with a total width of 5 nm or less, that is, around 2.5 nm on either side from the center of the grain boundaries, was formed, regardless of the type of dopant, in polycrystalline ceramic dielectrics whose grain boundary composition was controlled using different dopants. Also, it was observed that the dopants were most highly concentrated at the center of the grain boundaries, and that gradually diminished toward the crystal grain bulks on both sides and then disappeared. Based on the concentrations of the dopants that decreased gradually away from the center of the grain boundaries where the dopants have the highest concentrations, it can be found out that the control of the grain boundary composition using dopants was achieved as intended in an example of implementation. It can be seen that all types of dopants were not distributed beyond the thin dopant grain boundary composition control layer with a total of 5 mm or less. From this, it can be confirmed that the dopants were not distributed toward the crystal grain bulk regions.

TEST EXAMPLE 2: MEASUREMENT OF AC FREQUENCY-DEPENDENT DIELECTRIC PROPERTIES

Both sides of a disc-shaped pellet sample prepared according to Preparation Example were ground and then electrode treatment was done by applying Ag paste onto both sides by silk screening.

The relative permittivity and dielectric loss of a polycrystalline ceramic dielectric treated with an Ag electrode on both sides as described above were measured by applying an AC electric field in a frequency range of 100 Hz to 1 GHz using an impedance analyzer.

Figure 11:
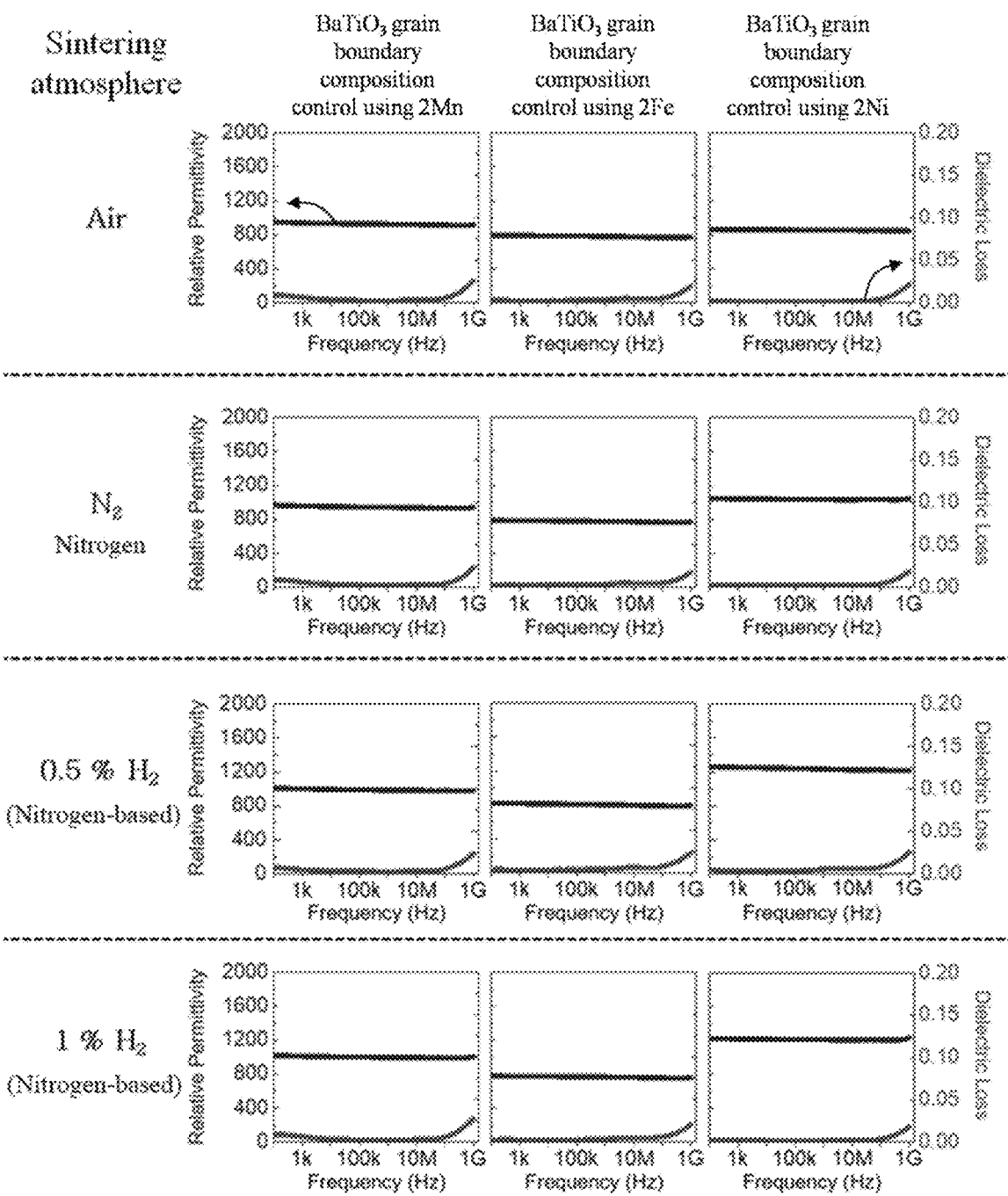
FIGS. 11 and 12 are views illustrating a comparison of frequency-dependent dielectric properties of polycrystalline dielectrics whose grain boundary composition was controlled, which were thermally treated under various sintering atmospheres, according to an embodiment of the present disclosure.
Figure 12:
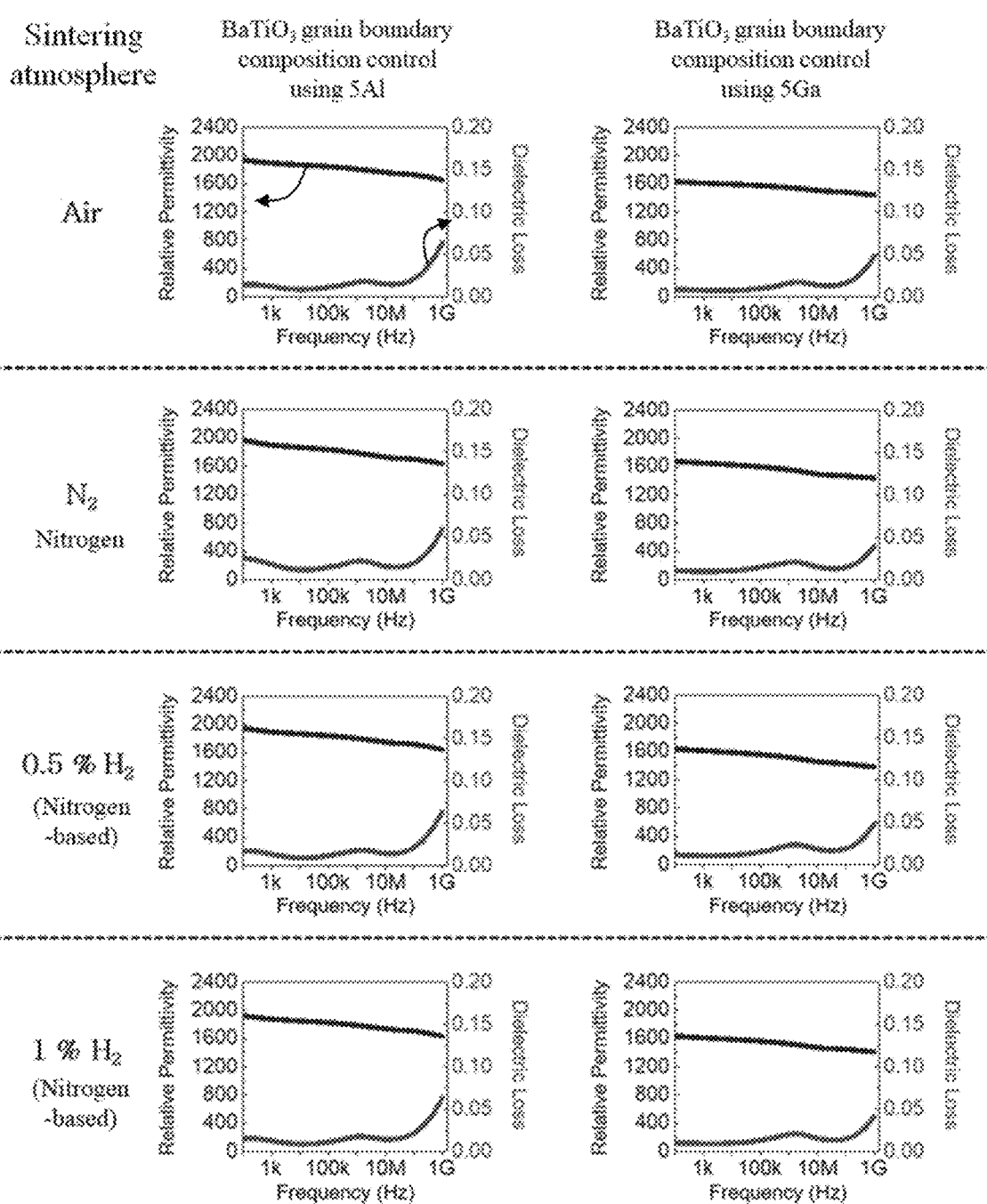

FIGS. 11 and 12 are views frequency-dependent dielectric properties of polycrystalline dielectrics whose grain boundary composition was controlled, which were sintered under different oxidation and reduction sintering atmospheric conditions, according to an example of implementation. It can be seen that, when all types of polycrystalline dielectrics whose grain boundary composition was controlled were sintered in an oxidation atmosphere or a reducing atmosphere of 1% $H_2$—$N_2$, the dielectric properties such as relative permittivity and dielectric loss were not changed. This suggests that the generation of extrinsic oxygen vacancies and conducting electrons was suppressed by using acceptor dopants acting as acceptors for barium titanate, as intended to give non-reducibility to the polycrystalline dielectrics in the embodiments of the present disclosure.

Moreover, it can be found out that the polycrystalline dielectrics whose grain boundary composition was controlled, as prepared according to the example of implementation, have low dielectric losses and relatively high relative permittivity at measured frequencies over a wide frequency range. It was observed that they exhibited very low dielectric losses of no more than 1% at AC frequencies of 10 or 100 MHz and below, low dielectric losses of no more than 2.5% at very high frequencies of up to 1 GHz, and high relative permittivity of $10^3$ or above. From these results, it can be concluded that low dielectric losses and high relative permittivity are maintained in a wide frequency range because the grain boundary composition is controlled using dopants as intended in the example of implementation of the present disclosure.

In the example of implementation, a ferroelectric and fine domain structure was formed to bring about the effect of dielectric loss suppression at high frequencies, and to this end, a fine crystal grain-sized ceramic dielectric was produced. In order for a ceramic dielectric to have a fine crystal grain size, a dopant distribution structure for grain boundary composition control is required to effectively suppress crystal grain growth, and at the same time, fine-sized barium titanate needs to be used at an initial stage. As such, in the example of implementation, nano-sized barium titanate was used, and a polycrystalline dielectric whose grain boundary composition was controlled using dopants was prepared by using initial barium titanate powder of different sizes. The dielectric properties and fine structure of the polycrystalline dielectric was depicted in FIG. 13.

Figure 13:
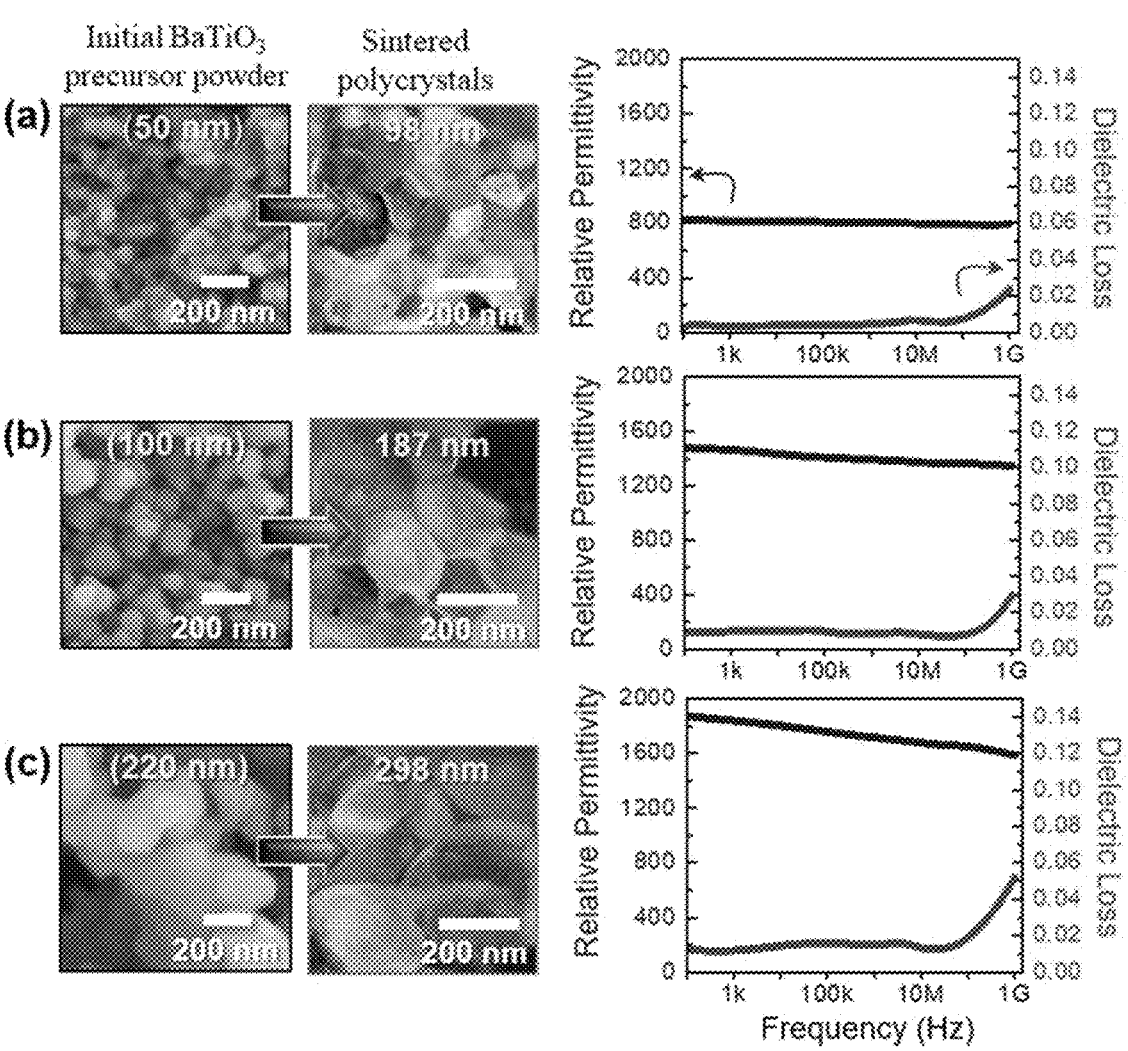
FIG. 13 is a view illustrating a comparison of how crystal grain size is adjusted and frequency-dependent dielectric properties vary, when the size of precursor barium titanate powder is adjusted, in polycrystalline dielectrics whose grain boundary composition was controlled, which were thermally treated under a 0.5% $H_2$—$N_2$ reducing atmosphere, according to an embodiment of the present disclosure.

FIG. 13 is a view illustrating a comparison of how fine structure and frequency-dependent dielectric properties vary when the size of precursor barium titanate powder is adjusted, according to an example of implementation. The polycrystalline ceramic dielectrics shown in the drawing were those that were sintered in a reducing atmosphere of 0.5% $H_2$—$N_2$. It can be found out through fine structure measurement that the crystal grains of the sintered dielectrics whose grain boundary composition was controlled using dopants increase in proportion to the size of the precursor barium titanate powder. Moreover, as can be seen from the comparison of frequency-dependent dielectric properties, dielectric losses at high frequencies of 100 MHz and above decreased sequentially with decreasing crystal grain size. These results suggest that, as mentioned previously, low ferroelectricity allows for smoother polarization reaction to an AC electric field. Moreover, it was possible to achieve low dielectric losses equally at low frequencies of 10 to 100 MHz and below by controlling the grain boundary composition of every ceramic dielectric using dopants, regardless of the size of the precursor powder.

Moreover, it was demonstrated that the use of barium titanate powder of different sizes enables permittivity control. Using precursor powder of 50 nm to 220 nm, it was possible to prepare dielectrics with relatively permittivity of 800 to 2,000 whose grain boundary composition was controlled using dopants, according to use. Particularly, it was discovered that, in the case of a ceramic dielectric using Fe dopants, the crystal grain size was not more than twice the diameter of the initial precursor powder even after sintering. Also, it was confirmed that the control of the grain boundary composition using dopants can suppress crystal grain growth and therefore reduce dielectric losses at high frequencies.

As mentioned above, the grain growth in polycrystalline dielectrics whose grain boundary composition was controlled using initial barium titanate powder of different sizes, was suppressed regardless of the type of initial powder. Additionally, the increase in the amount of initial barium titanate powder used due to change of the size of initial barium titanate powder increased the crystal grains and ferroelectricity of the ceramic dielectric after sintering, thereby resulting in an increase in relative permittivity and an increase in dielectric losses at high frequencies. Variation of the dielectric properties for different sizes of initial barium titanate powder and images of fine structure measurements showing this variation were depicted in FIGS. 14 and 15.

Figure 14:
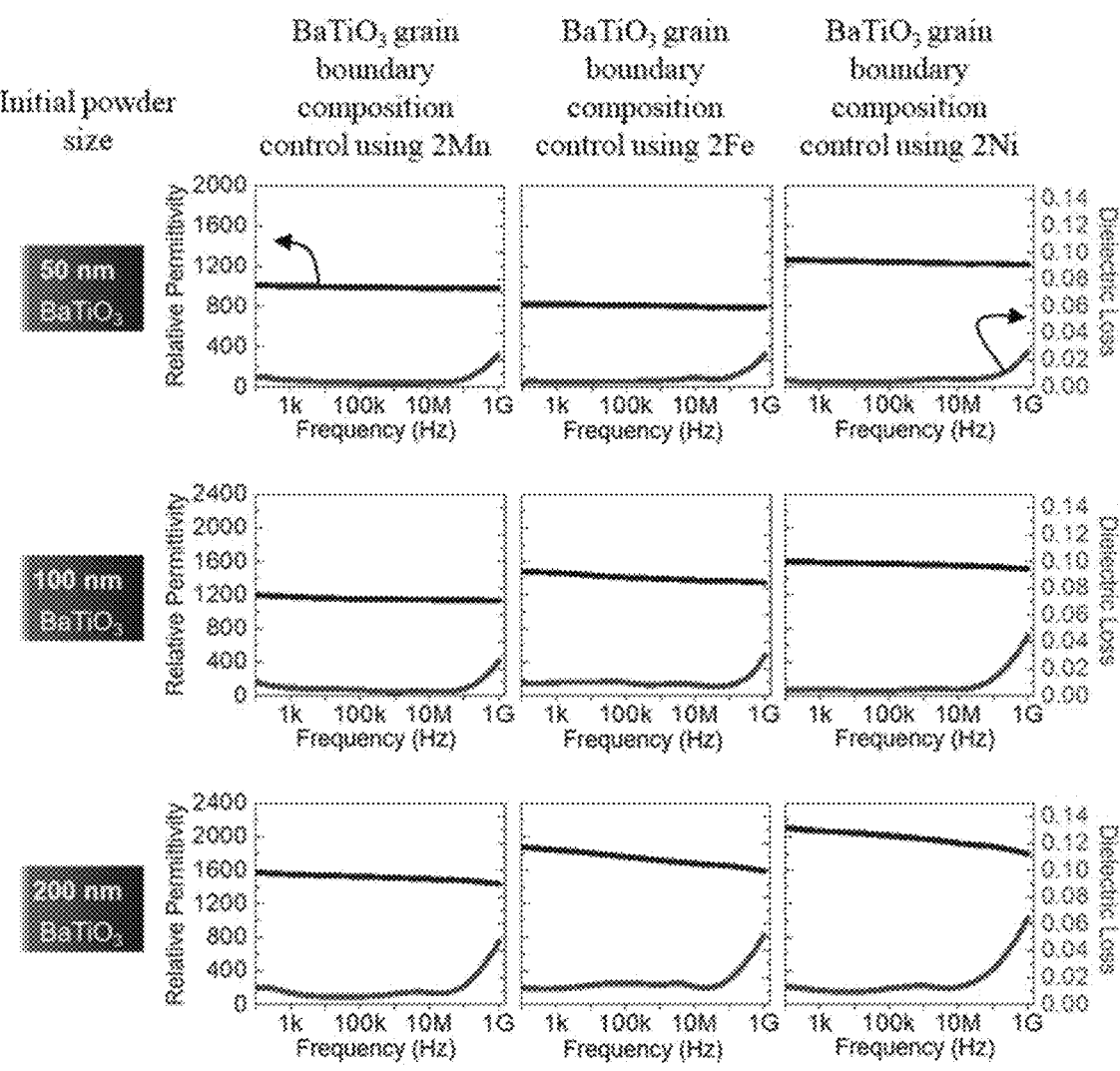
FIG. 14 is a view showing a comparison of frequency-dependent dielectric properties of polycrystalline dielectrics whose grain boundary composition was controlled using dopants, which were prepared for different sizes of initial barium titanate powder, according to an embodiment of the present disclosure.

FIG. 14 is a view showing a comparison of frequency-dependent dielectric properties of dielectrics whose grain boundary composition was controlled using dopants, which were prepared for different sizes of initial barium titanate powder. The polycrystalline ceramic dielectrics shown in the drawing were those sintered in a reducing atmosphere of 0.5% $H_2$—$N_2$. It can be found out that all of the polycrystalline ceramic dielectrics whose grain boundary composition was controlled using different types of dopants showed an increase in relative permittivity in proportion to the size of initial barium titanate powder. Similarly, it can be seen that the dielectric losses at high frequencies of 100 MHz and above increased with increasing size of initially used barium titanate powder. That is, as the size of initially used barium titanate powder increases, the crystal grain size of the ceramic dielectrics after sintering increased and therefore the ferroelectricity also increased, which led to an increase in relative permittivity and dielectric loss at high frequencies. This suggests that it is necessary to use initial barium titanate powder with lower ferroelectricity that is nano-sized and fine-grained, in order to efficiently reduce dielectric losses at high frequencies. On the other hand, it can be seen that the use of initial barium titanate powder with a relatively large size of around 200 nm allows for maintaining low dielectric losses of less than 2% at low frequencies of 10 to 100 MHz and below.

Figure 15:
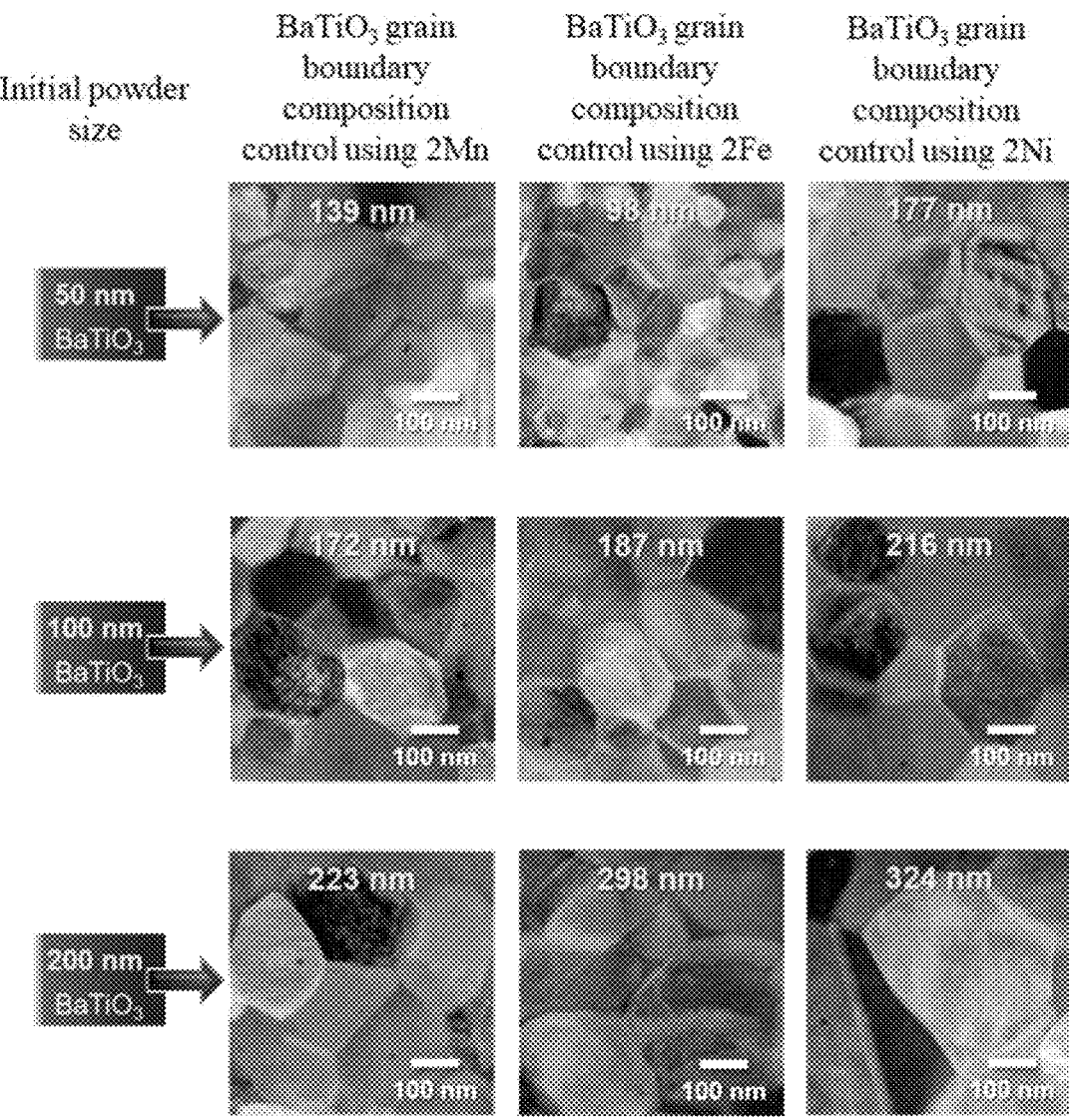
FIG. 15 shows scanning transmission electron microscopic images of fine structures and average crystal grain sizes of polycrystalline dielectrics whose grain boundary composition was controlled, which were prepared for different sizes of initial precursor barium titanate powder, according to an embodiment of the present disclosure.

FIG. 15 shows images of fine structures obtained by a scanning transmission electron microscope, in polycrystalline dielectrics whose grain boundary composition was controlled, which were prepared for different sizes of initial precursor barium titanate powder. The polycrystalline ceramic dielectrics shown in the drawing were those sintered in a reducing atmosphere of 0.5% $H_2$—$N_2$. It can be found out that all of the polycrystalline ceramic dielectrics whose grain boundary composition was controlled using, which were prepared using initial barium titanate powder of different sizes for different types of dopants showed an increase in the crystal grain size of the ceramic dielectrics in proportion to the size of barium titanate powder. These results may be evidence of changes in dielectric properties shown in FIG. 8. Accordingly, it can be concluded that the suppression of crystal grain growth using dopants selectively at grain boundaries for grain boundary composition control and the use of nano-sized, fine-grained initial barium titanate powder are necessary in order to achieve low dielectric losses at high frequencies.

TEST EXAMPLE 3: MEASUREMENT OF
ELECTRIC FIELD-DEPENDENT
POLARIZATION HYSTERESIS LOOPS,
RELATIVE PERMITTIVITY AND
TEMPERATURE STABILITY

Both sides of a disc-shaped pellet sample prepared according to Preparation Example were ground and then electrode treatment was done by applying Ag paste onto both sides by silk screening.

The electric field-dependent polarization hysteresis loops of a polycrystalline ceramic dielectric treated with an Ag electrode on both sides as described above were measured by applying a DC voltage of 4,000 V using a ferroelectric property analyzer, which were depicted in FIG. 10.

Figure 16:
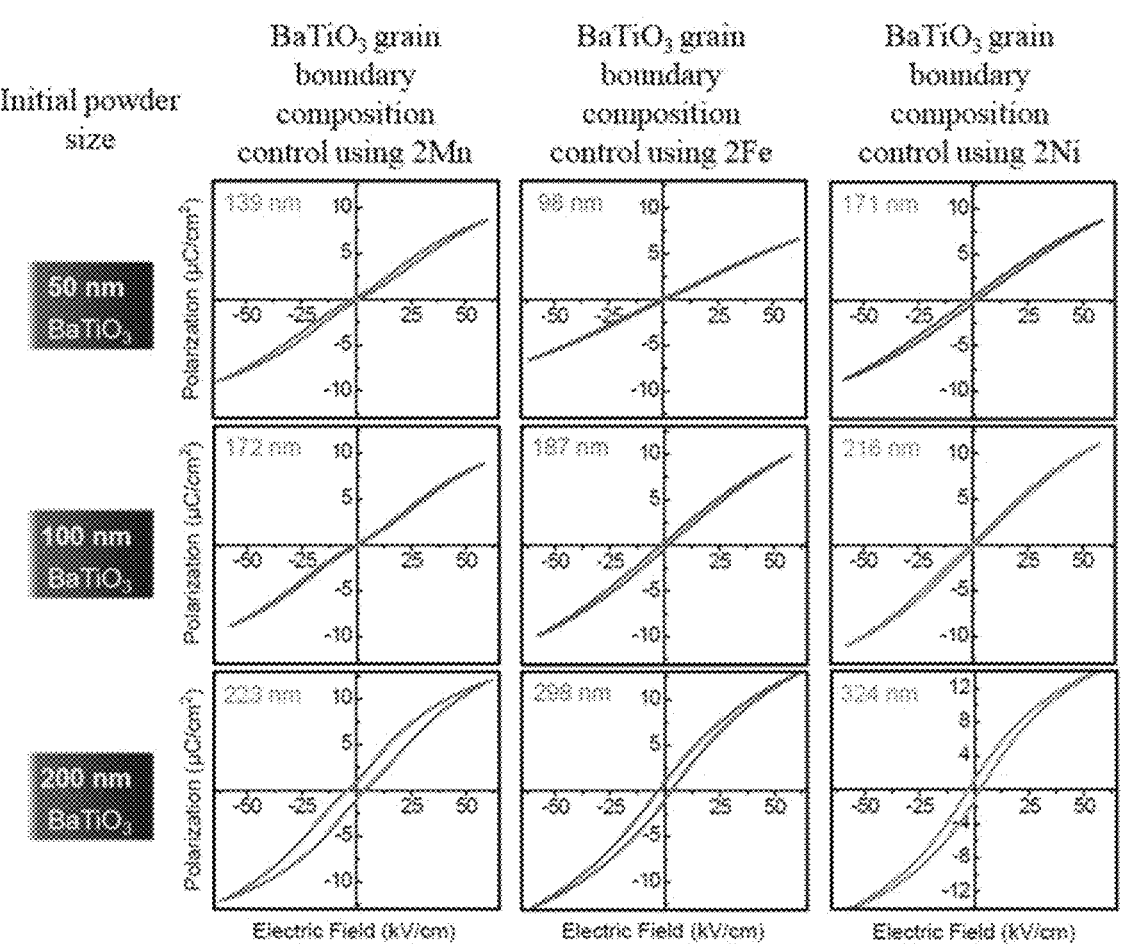
FIG. 16 is a view illustrating electric field-dependent polarization hysteresis loops for polycrystalline dielectrics whose grain boundary composition was controlled, which were prepared for different sizes of initial precursor barium titanate powder, according to an embodiment of the present disclosure.

FIG. 16 is a view illustrating results of measurement of DC voltage-dependent polarization hysteresis loops for dielectrics whose grain boundary composition was controlled, which were prepared for different sizes of initial barium titanate powder. The polycrystalline ceramic dielectrics shown in the drawing were those sintered in a reducing atmosphere of 0.5% $H_2$—$N_2$. It was found out that the saturation polarization and coercive field of the polarization hysteresis loops increased gradually with increasing size of initial barium titanate powder used. That is, the polarization and ferroelectricity of the ceramic dielectrics increased in proportion to the size of initial barium titanate powder. Based on these results, the results shown in FIGS. 14 and 15 can be made more reliable, which suggests that it is necessary to use nano-sized, fine-grained initial barium titanate powder to reduce dielectric losses in a high-frequency range. Moreover, based on the hysteresis loops shown in the polarization measurement, it can be seen that the ferroelectricity of the crystal grain bulks is fully maintained.

Figure 17:
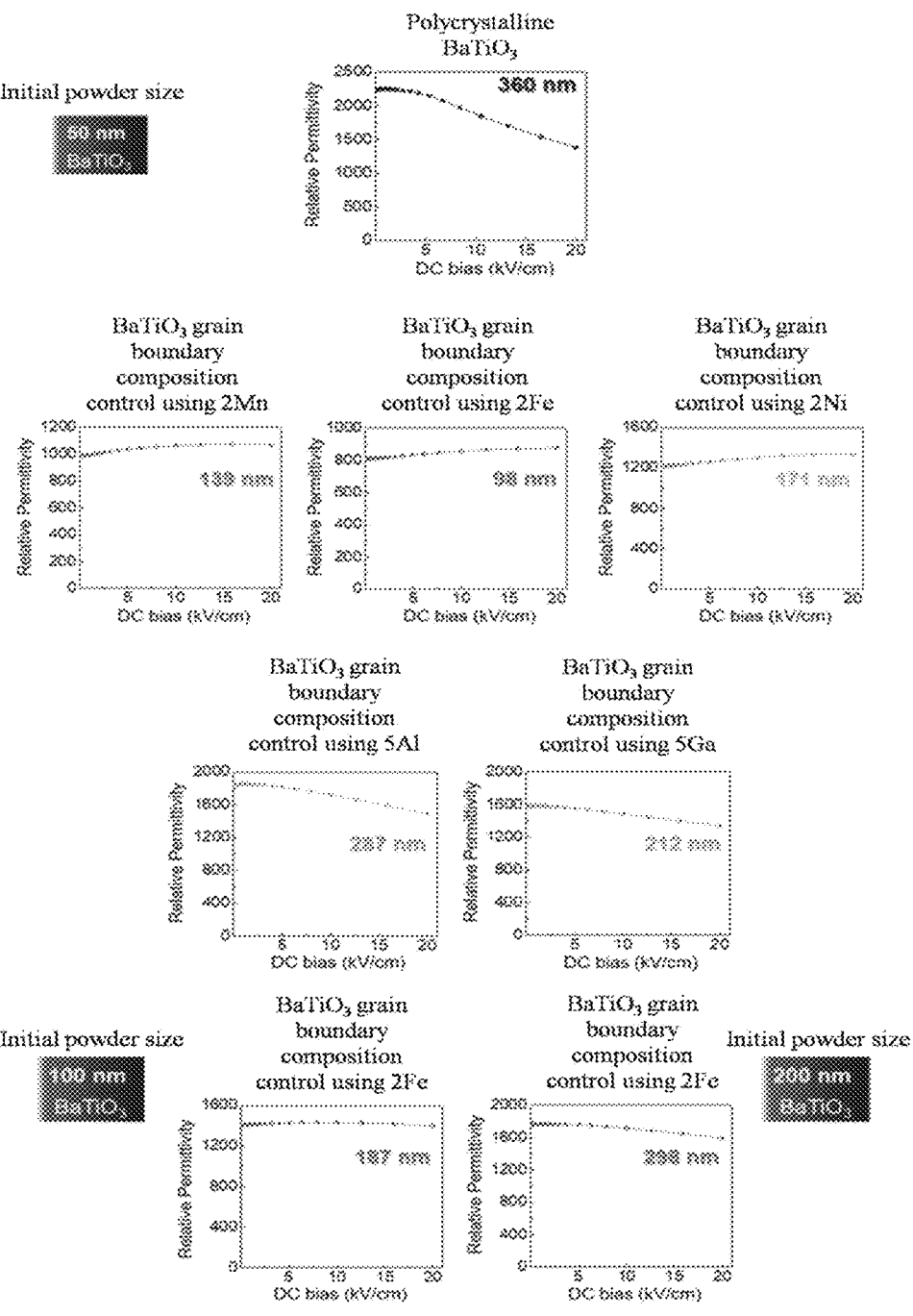
FIG. 17 is a view illustrating a comparison of variation of the DC electric field-dependent relative permittivity of polycrystalline dielectrics whose grain boundary composition was controlled using different types of dopant atoms, according to an embodiment of the present disclosure.

The electric field-dependent relative permittivity of a polycrystalline ceramic dielectric treated with an Ag electrode on both sides as described above was measured by applying a DC voltage of 1,000 V using a power device analyzer, which were depicted in FIG. 17.

FIG. 17 is a view illustrating measurements of variation in the DC electric field-dependent relative permittivity of polycrystalline dielectrics whose grain boundary composition was controlled using different types of dopant atoms. The polycrystalline ceramic dielectrics shown in the drawing were those sintered in a reducing atmosphere of 0.5% $H_2$—$N_2$, except for a $BaTiO_3$ control group sintered under an atmospheric condition. It was found out that the relative permittivity of pure $BaTiO_3$ was reduced by 30% or more up to 20 kV/cm, and that the amount of reduction in the electric field-dependent relative permittivity of dielectrics whose grain boundary composition was controlled using dopants decreased significantly for all types of dopant atoms. Particularly, in the case of polycrystalline ceramic dielectrics whose grain boundary composition was controlled using manganese (Mn), iron (Fe), and nickel (Ni) dopants, the amount of reduction in electric field-dependent relative permittivity is significantly low within the measurement range. Specifically, the amount of reduction in the relative permittivity of the dielectric using Fe dopants was as small as or smaller than 10% with an electric field of up to 20 kV/cm even though precursor powder of 100 nm to 200 nm, instead of 50 nm, was used as the initial barium titanate. This reduction in DC electric field-dependent relative permittivity tends to decrease with decreasing size of crystal grains. This shows that it is necessary to suppress crystal grain growth by using finer-grained precursor powder and controlling the grain boundary composition in order to provide good electric field-dependent relative permittivity. As such, the polycrystalline ceramic dielectrics according to the present embodiment may have a relative permittivity variation range of +15% or −15% with an electric field of 20 kV/cm and above.

Figure 18:
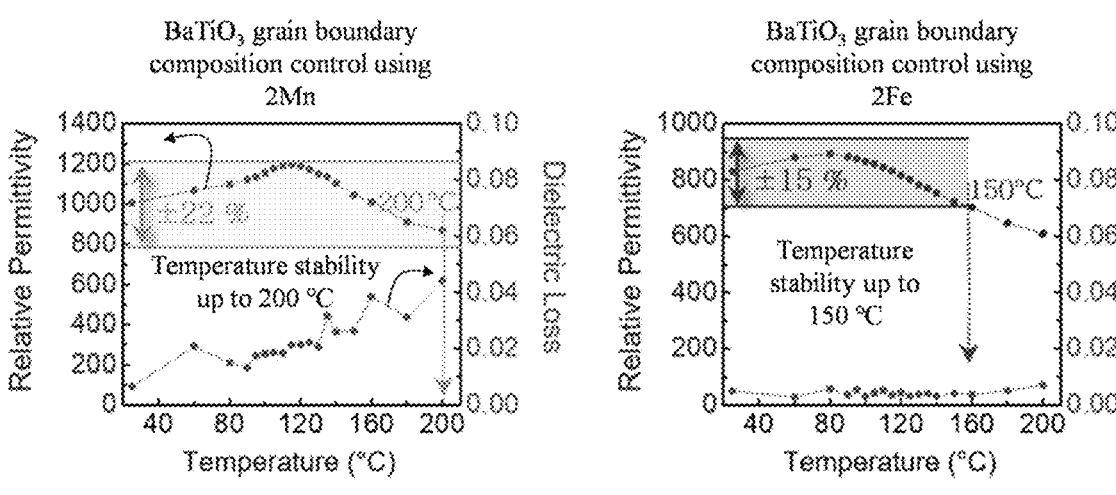
FIG. 18 is a view illustrating temperature-dependent dielectric properties of polycrystalline dielectrics whose grain boundary composition was controlled, which were thermally treated under a 0.5% $H_2$—$N_2$ reducing atmosphere, according to an embodiment of the present disclosure.

The relative permittivity and dielectric loss of a polycrystalline ceramic dielectric treated with an Ag electrode on both sides was measured at 1 KHz by making a temperature change in a range of 25° C. to 200° C., which were depicted in FIG. 18.

FIG. 18 is a view illustrating temperature-dependent dielectric properties of polycrystalline dielectrics whose grain boundary composition was controlled. To achieve a ceramic capacitor which is required to operate stably in a severe environment, ceramic dielectrics require temperature-dependent stability. It can be seen that a polycrystalline ceramic dielectric whose grain boundary composition was controlled using manganese (Mn) dopants had a relative permittivity variation range of ±22% at room temperatures up to 200° C. Also, it can be seen that a polycrystalline ceramic dielectric whose grain boundary composition was controlled using iron (Fe) dopants had a relative permittivity variation range of ±15% at room temperatures up to 150° C. Consequently, it can be found out that polycrystalline dielectrics with low ferroelectricity whose grain boundary composition was controlled may have high temperature stability even without employing a core-shell structure in which most of crystal grain bulks exist as paraelectrics. This high temperature stability shows their potential for becoming substantial stacked ceramic capacitors.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The embodiments of the invention in which an exclusive property or privilege is claimed are defined as follows:

1. A polycrystalline ceramic dielectric comprising: crystal grain bulks comprising a barium titanate-based ceramic; and grain boundaries comprising interfaces between the crystal grain bulks, wherein the composition of the grain boundaries is controlled using dopants, and the polycrystalline ceramic dielectric maintains non-reducibility under a reducing sintering atmosphere, and wherein the dopants are distributed in the highest concentration at the center of the grain boundaries, and are normally distributed to decrease in concentration from the center of the grain boundaries in both directions.

2. The polycrystalline ceramic dielectric of claim 1, wherein the ceramic has $ABO_3$, wherein the A at least comprises Ba, and the B at least comprises Ti.

3. The polycrystalline ceramic dielectric of claim 2, wherein the A further comprises Ca, Sr, or a combination thereof.

4. The polycrystalline ceramic dielectric of claim 2, wherein the B further comprises Zr, Hf, or a combination thereof.

5. The polycrystalline ceramic dielectric of claim 1, wherein the dopants comprise Mn, Fe, Co, Ni, Al, Ga, or a combination thereof.

6. The polycrystalline ceramic dielectric of claim 1, wherein the dopants are distributed in a concentration of 1 to 10 molar parts with respect to 100 molar parts of the ceramic.

7. The polycrystalline ceramic dielectric of claim 1, wherein precursor powder of the barium titanate for the ceramic has an average particle diameter of 50 nm or less.

8. A polycrystalline ceramic dielectric comprising:

crystal grain bulks comprising a barium titanate-based ceramic; and grain boundaries comprising interfaces between the crystal grain bulks, wherein the composition of the grain boundaries is controlled using dopants, and the polycrystalline ceramic dielectric maintains non-reducibility under a reducing sintering atmosphere, and wherein the dopants are distributed across a width of 5 nm or less with respect to the center of the grain boundaries.

9. The polycrystalline ceramic dielectric of claim 1, wherein the dopants are present in the crystal grain bulks in a concentration of 0.5 molar parts or less with respect to 100 molar parts of the ceramic, and the crystal grain bulks maintain ferroelectricity.

10. The polycrystalline ceramic dielectric of claim 1, wherein random grain growth of the crystal grain bulks is suppressed using the dopants.

11. The polycrystalline ceramic dielectric of claim 1, wherein each of the crystal grain bulks has an average crystal grain size not more than twice the diameter of the barium titanate precursor for the ceramic.

12. The polycrystalline ceramic dielectric of claim 1, wherein the polycrystalline ceramic dielectric has a relative permittivity of 800 to 2,000 depending on the size of the crystal grain bulks, and maintains the value of the relatively permittivity depending on the frequency.

13. The polycrystalline ceramic dielectric of claim 1, wherein the polycrystalline ceramic dielectric has dielectric losses of 1% or less in a frequency range of 100 MHz and below and dielectric losses of 2.5% or less in a frequency range of 1 GHz and below.

14. The polycrystalline ceramic dielectric of claim 1, wherein the polycrystalline ceramic dielectric has a relative permittivity variation range of +15% at temperatures up to 150° C. or a relative permittivity variation range of +22% at temperatures up to 200° C.

15. The polycrystalline ceramic dielectric of claim 8, wherein the dopants comprise Mn, Fe, Co, Ni, Al, Ga, or a combination thereof.

16. The polycrystalline ceramic dielectric of claim 8, wherein the polycrystalline ceramic dielectric has dielectric losses of 1% or less in a frequency range of 100 MHz and below and dielectric losses of 2.5% or less in a frequency range of 1 GHz and below.

17. The polycrystalline ceramic dielectric of claim 8, wherein the polycrystalline ceramic dielectric has a relative permittivity variation range of +15% at temperatures up to 150° C. or a relative permittivity variation range of #22% at temperatures up to 200° C.

18. The polycrystalline ceramic dielectric of claim 8, wherein the ceramic has $ABO_3$, wherein the A at least comprises Ba, and the B at least comprises Ti.

19. The polycrystalline ceramic dielectric of claim 8, wherein precursor powder of the barium titanate for the ceramic has an average particle diameter of 50 nm or less.

* * * * *